(12) United States Patent
Yan et al.

(10) Patent No.: US 8,413,874 B2
(45) Date of Patent: Apr. 9, 2013

(54) SYNCHRONOUS ULTRASONIC METAL WELDING DEVICE WITH DOUBLE-HEADS

(75) Inventors: Zhuosheng Yan, Guangdong Province (CN); Zhuoli Yan, Guangdong Province (CN); Jinxuan Yan, Guangdong Province (CN); Rukun Yang, Guangdong Province (CN); Xiaobin Lu, Guangdong Province (CN); Xingtao Zhong, Guangdong Province (CN); Weishu Huang, Guangdong Province (CN)

(73) Assignee: Guangzhou Newpower Ultrasonic Electronic Equipment Co., Ltd., Guangdong (CN)

( * ) Notice: Subject to any disclaimer, the term of this patent is extended or adjusted under 35 U.S.C. 154(b) by 0 days.

(21) Appl. No.: 13/389,596

(22) PCT Filed: Aug. 4, 2010

(86) PCT No.: PCT/CN2010/001185
§ 371 (c)(1),
(2), (4) Date: Feb. 9, 2012

(87) PCT Pub. No.: WO2011/094921
PCT Pub. Date: Aug. 11, 2011

(65) Prior Publication Data
US 2012/0138663 A1 Jun. 7, 2012

(30) Foreign Application Priority Data

Feb. 5, 2010 (CN) .......................... 2010 1 0109380

(51) Int. Cl.
*B23K 1/06* (2006.01)
*B23K 37/00* (2006.01)
(52) U.S. Cl.
USPC ....................... 228/1.1; 228/110.1; 156/580.2
(58) Field of Classification Search ................... 228/1.1, 228/110.1; 156/580.2
See application file for complete search history.

(56) References Cited

U.S. PATENT DOCUMENTS

| 4,401,501 A * | 8/1983 | Stumpf | 156/367 |
| 2009/0126317 A1* | 5/2009 | Bachner et al. | 53/133.2 |

* cited by examiner

*Primary Examiner* — Nicholas P D'Aniello

(57) ABSTRACT

A synchronous ultrasonic metal welding device with double-heads has two sets of ultrasonic welding mechanisms which are installed side by side on a middle frame (18). The middle frame (18) is composed of assembling flanges (19) and two sliding stop rods (11) which are in parallel each other. The ultrasonic welding mechanisms are located on the assembling flanges (19) which are connected with driving devices (3) respectively. The driving devices (3) drive the ultrasonic welding mechanisms moving toward each other and welding synchronously. By using the welding device of the invention, multi-layer metal pieces of the power battery can be double-sided welded simultaneously by way of spot welding or roll welding, so the work efficiency can be improved, and the welding layer can be strong in one time.

3 Claims, 4 Drawing Sheets

SYNCHRONOUS ULTRASONIC METAL WELDING DEVICE WITH DOUBLE-HEADS

BACKGROUND OF THE INVENTION

The present invention relates to a welding device and more particularly pertains to a synchronous ultrasonic metal welding device with double-heads.

Present ultrasonic metal welding devices mainly have a structure wherein one ultrasonic energy converter is installed at one welding device. Occasionally, double ultrasonic energy converter structure could be found wherein two ultrasonic energy converters are installed at one welding device to operate synchronously on the same single mold on the same single plane so as to strengthen the weld on the same workpiece. This imposes restrictions on the manufacturing process for present metal pieces of power batteries. With the gradual shortage of energy and the increasingly adverse effects on the human living environment caused by the discharge of waste gas, waste water and solid waste to the biological environment, the tension has already been heightened. To cater for the needs of the market, high-power recyclable power batteries with zero waste discharge and zero secondary pollution (e.g. lithium batteries) are promoted, and eventually motor vehicles and ships and so forth which are powered by power batteries will also be more popularized. Such high-power batteries are advantageous in that they have high battery capacity and load as well as high amplitude and efficiency, but their terminal structure must be multi-layer (tens or hundreds of multi-layer copper, multi-layer tin, multi-layer nickel or multi-layer aluminum, etc). The multi-layer metal pieces are welded on a terminal tab with one half on a first side and the other half on a second side parallel and opposite to the first side. If welding is done by traditional welding device with only one ultrasonic energy converter installed at one welding device, it is necessary to first weld the first side, and then turn-around and weld the second side, and the following manufacturing problems arise with such operation procedure: First, using the first welding position as the bottom die pad would not fulfill the smooth grade requirement, which results in poor effect for the second welding, and the welded layers are uneven. Second, when welding for the second time, the multi-layer metal pieces which have been welded at the first welding will be loosened by vibration or even detached by impact, thereby resulting in operation failure and thus becoming rejected products due to failure to meet standards.

BRIEF SUMMARY OF THE INVENTION

The object of the present invention is to overcome the aforesaid disadvantages now present in the ultrasonic welding devices by providing a synchronous ultrasonic metal welding device with double-heads which can attain high work efficiency and guarantee weld quality.

To attain the aforesaid objects of invention, the synchronous ultrasonic metal welding device with double-heads of the present invention comprises two sets of corresponding ultrasonic welding mechanisms. The two sets of corresponding ultrasonic welding mechanisms are installed side by side on a middle frame. The middle frame comprises assembling flanges and two sliding stop rods which are in parallel to each other. The ultrasonic welding mechanisms are disposed on the assembling flanges which are connected with driving devices respectively. The driving devices drive the ultrasonic welding mechanisms to move toward each other and weld synchronously.

The driving devices are double-head cylinders, and output shafts of the double-head cylinders are coupled with the assembling flanges of the middle frame.

The ultrasonic welding mechanisms comprise ultrasonic energy converters, assembling flanges and weld molds; the ultrasonic welding mechanisms are disposed on the assembling flanges; the assembling flanges are mounted on the middle frame.

The ultrasonic welding mechanisms are perpendicular to the middle frame.

The weld molds may be spot weld molds, and spot weld toothed wheels are disposed symmetrically on the spot weld molds.

The weld molds may be roll weld molds; motors are disposed on the ultrasonic welding mechanisms; the motors are coupled to each other via synchronizing wheels so as to drive the ultrasonic welding mechanisms to synchronously roll and weld.

The base board is fixedly disposed with a cooler frame; a cooler is fixedly disposed on the cooler frame; a pipe from the cooler is coupled to the driving cylinders via a pressure regulating filter assembly and a regulator.

The driving cylinders are coupled to an electromagnetic valve assembly.

In comparison with the prior art, the present invention has the following advantageous effects: By means of the aforesaid corresponding ultrasonic welding mechanisms, multi-layer metal pieces of the power battery can be double-sided welded simultaneously by way of spot welding or roll welding, so the work efficiency can be doubled. Double-sided simultaneous welding could also reduce vibrations of the workpiece, and more importantly avoid quality deficiencies occurred when the multi-layer metal pieces welded in the first pass are loosened by vibration or even detached by impact due to the vibrations caused by the second welding. Double-sided simultaneous welding could attain even weld, and welding in one pass results in more reliable welded layers and thus quality is ensured.

DETAILED DESCRIPTION OF THE INVENTION

Figure 1:
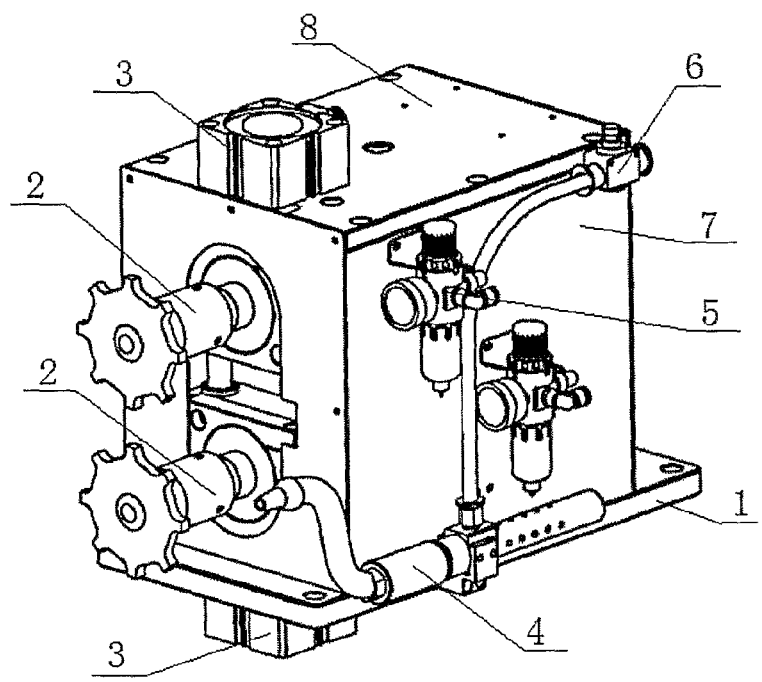
FIG. 1 is a first perspective view of the synchronous ultrasonic metal welding device with double-heads according to the present invention.
Figure 2:
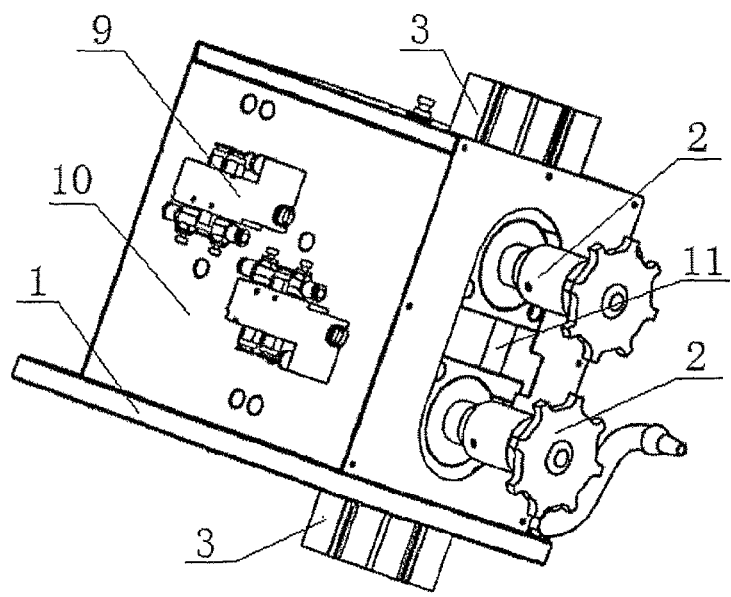
FIG. 2 is a second perspective view of the synchronous ultrasonic metal welding device with double-heads according to the present invention.
Figure 3:
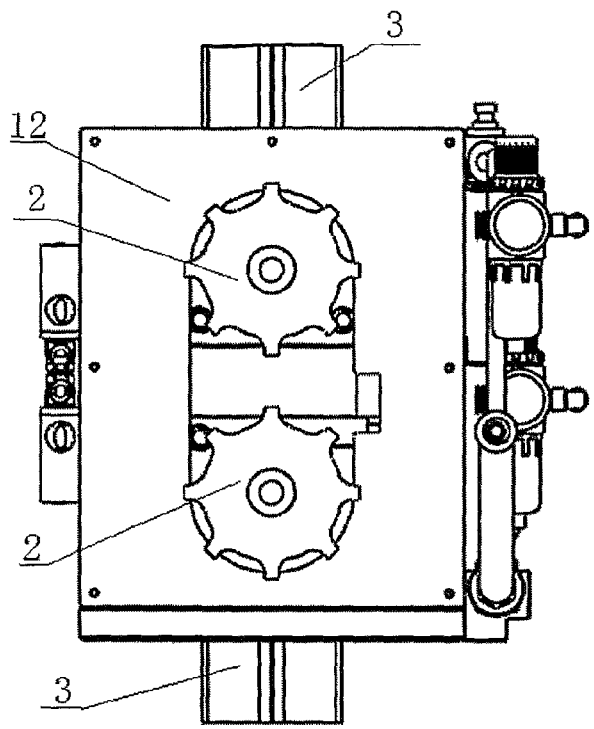
FIG. 3 is a front view of the synchronous ultrasonic metal welding device with double-heads according to the present invention.
Figure 4:
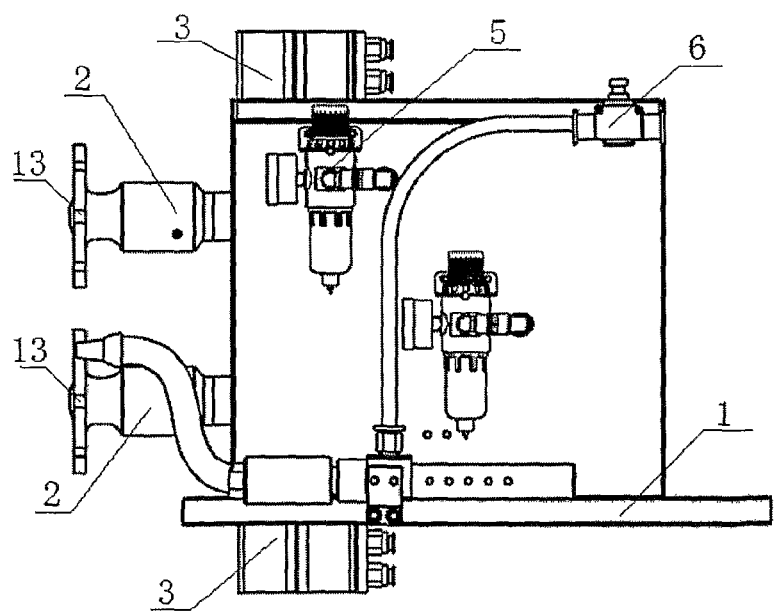
FIG. 4 is a right side view of the synchronous ultrasonic metal welding device with double-heads according to the present invention.
Figure 5:
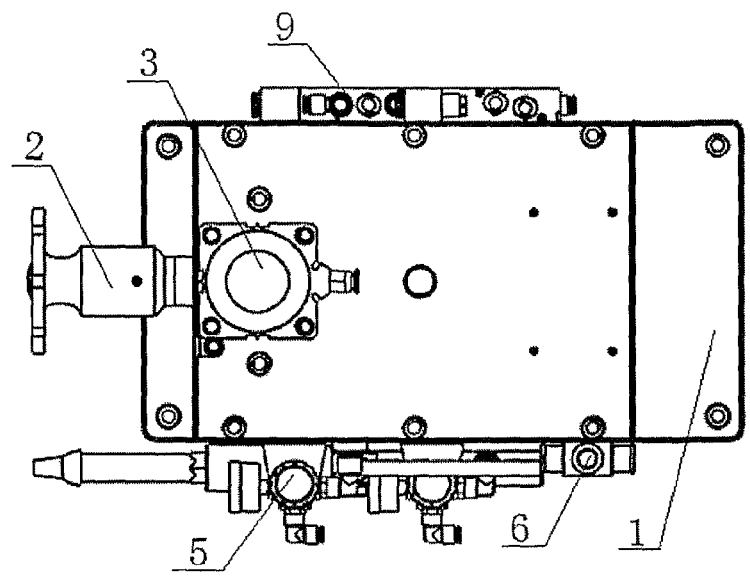
FIG. 5 is a top view of the synchronous ultrasonic metal welding device with double-heads according to the present invention.

The synchronous ultrasonic metal welding device with double-heads of the present invention is described in detail hereof with the embodiment and the accompanying drawings.

As illustrated in FIGS. 1-7, the synchronous ultrasonic metal welding device with double-heads comprises two sets of corresponding ultrasonic welding mechanisms which are installed side by side on a middle frame 18. The middle frame 18 comprises assembling flanges and two sliding stop rods 11 which are in parallel to each other. The ultrasonic welding mechanisms are disposed on the assembling flanges 19 which are connected with driving devices 3 respectively. The two driving devices 3, one disposed on top and the other disposed at bottom, are coupled with the assembling flanges 19 and drive the ultrasonic welding mechanisms to move toward each other and weld synchronously. The driving devices 3 are double-head cylinders. The output shafts of the double-head cylinders 3 are coupled with the assembling flanges 19 of the middle frame 18. During welding, the double-head cylinders 3 drive the synchronous weld molds of the two sets of ultrasonic welding devices to synchronously move toward each other and therefore top and bottom positions of the workpiece could be welded in one pass. The ultrasonic welding mechanisms may comprise ultrasonic energy converters 16, assembling flanges 19 and weld molds 2. The ultrasonic welding mechanisms are disposed on the assembling flanges 19 so that they are perpendicular to the middle frame. The ultrasonic welding mechanisms are mounted on the middle frame 18 via the assembling flanges 19 so as to be strictly perpendicular to the middle frame. Under the action of the driving devices 3, the two sets of ultrasonic welding mechanisms move toward each other in opposite directions, one toward the top and the other toward the bottom, along the sliding stop rods and weld. The assembling flanges 19 are mounted on the middle frame 18. The middle frame is perpendicular to the base board 1, and is fixedly disposed between the base board 1 and the top board 8. As illustrated in FIGS. 1-7, the weld molds may be spot weld molds and spot weld toothed wheels 13 are disposed symmetrically on the spot weld molds. The spot weld molds 2 spot welds the multi-layer metal pieces via the symmetrical spot weld toothed wheels 13.

Figure 6:
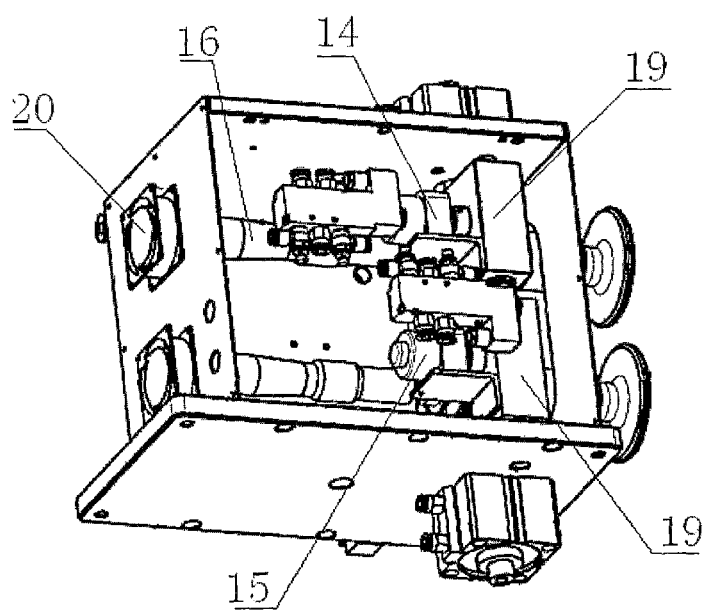
FIG. 6 is view illustrating the internal structure of the synchronous ultrasonic metal welding device with double-heads according to the present invention.
Figure 7:
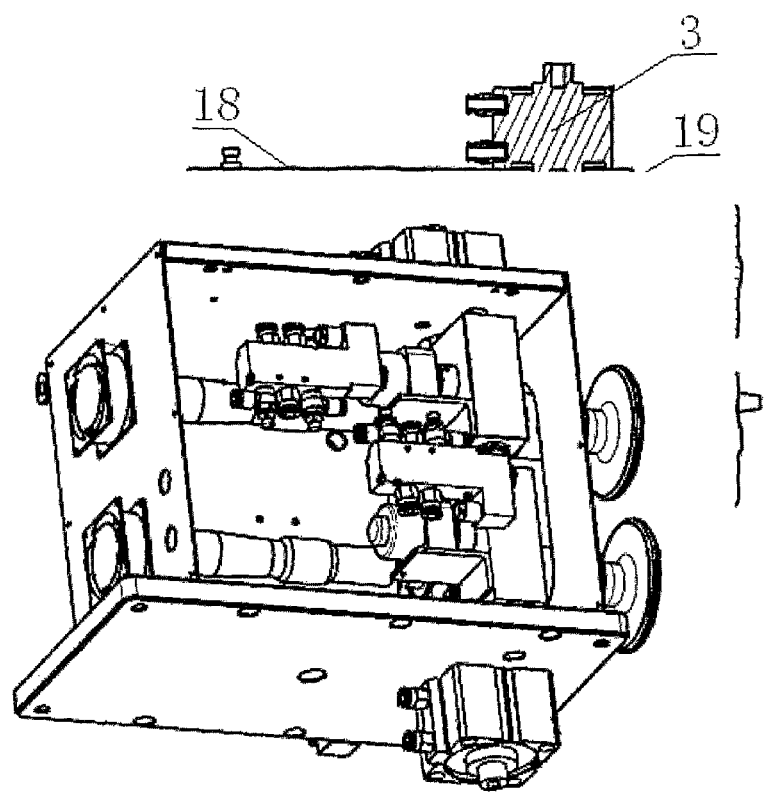
FIG. 7 is a cross-sectional view of the synchronous ultrasonic metal welding device with double-heads according to the present invention.

As illustrated in FIGS. 6 and 7, the weld molds may be roll weld molds. Motors 15 are disposed on the ultrasonic welding mechanisms. The motors are coupled to each other via synchronizing wheels 14 to enable the roll weld molds of the ultrasonic welding mechanisms to roll synchronously to weld.

By means of the aforesaid ultrasonic welding mechanisms, multi-layer metal pieces of the power battery can be double-sided welded simultaneously by way of welding, so the work efficiency can be significantly improved. Double-sided simultaneous welding could also avoid quality deficiencies such as the loosening of welded layers when one-side welding is conducted.

The base board 1 is fixedly disposed with a cooler frame. A cooler 4 is fixedly disposed on the cooler frame. The pipe from the cooler is coupled to the driving cylinders 3 via a pressure regulating filter assembly 5 and a regulator 6. The driving cylinders 3 are coupled to an electromagnetic valve assembly 9. The two driving cylinders 3 control the ultrasonic welding mechanisms to synchronously move toward each other so that multi-layer metal pieces of the power battery can be double-sided welded simultaneously. Two sides of the base board 1 are each enclosed by a left side board 10 and a right side board 7, and the top board 8 encloses the top of the base board 1. The left side of the base board 1 is disposed with a back plate, and a heat dissipating fan 20 is disposed on the back plate. The heat dissipating fan 20 may alternatively be disposed on the left side board 10, the right side board 7 or the top board 8.

The present invention is not limited by the above embodiment. Any changes or amendments to the present invention which do not depart from the spirits and scope of the present invention and fall within the scope of the claims or the technical field equivalent thereto are obviously within the scope of the present invention.

What is claimed is:

1. A synchronous ultrasonic metal welding device with double-heads which comprises two sets of corresponding ultrasonic welding mechanisms, characterized in that the two sets of corresponding ultrasonic welding mechanisms are installed side by side on a middle frame; the middle frame comprises assembling flanges and two sliding stop rods which are in parallel to each other; the ultrasonic welding mechanisms are disposed on the assembling flanges which are connected with driving devices respectively; the two sets of ultrasonic welding mechanisms are driven by the driving devices to move synchronously in opposite directions towards each other for synchronous double-sided welding of a workpiece; the driving devices are double-head cylinders, and output shafts of the double-head cylinders are coupled with the assembling flanges of the middle frame; the ultrasonic welding mechanisms comprise ultrasonic energy converters, assembling flanges and weld molds; the ultrasonic welding mechanisms are disposed on the assembling flanges; the assembling flanges are mounted on the middle frame; the ultrasonic welding mechanisms are perpendicular to the middle frame; the weld molds are roll weld molds; motors are disposed on the ultrasonic welding mechanisms; the motors are coupled to each other via synchronizing wheels for synchronized operation of the two sets of ultrasonic welding mechanisms.

2. The synchronous ultrasonic metal welding device with double-heads as in claim 1, characterized in that a base board is fixedly disposed with a cooler frame; a cooler is fixedly disposed on the cooler frame; a pipe from the cooler is coupled to the driving devices via a pressure regulating filter assembly and a regulator.

3. The synchronous ultrasonic metal welding device with double-heads as in claim 1, characterized in that the driving devices are coupled to an electromagnetic valve assembly.

\* \* \* \* \*